United States Patent [19]

Neely, Jr. et al.

[11] Patent Number: 5,936,154
[45] Date of Patent: Aug. 10, 1999

[54] DRIVER CONTROLLED AIR SYSTEM MOISTURE REMOVAL AND PRE-TRIP INSPECTION SYSTEM

[75] Inventors: Robert H. Neely, Jr., Fort Wayne; Lawrence H. Kuhn, New Haven, both of Ind.

[73] Assignee: Navistar International Transportation Corp., Chicago, Ill.

[21] Appl. No.: 08/920,153

[22] Filed: Aug. 26, 1997

[51] Int. Cl.⁶ .................................................... B60T 13/00
[52] U.S. Cl. .................................. 73/129; 73/39; 188/3 H
[58] Field of Search ................................. 73/39, 40.5 R, 73/121, 129; 188/3 H; 303/1, 2, 13, 35, 30, 60, DIG. 1, DIG. 3

[56] References Cited

U.S. PATENT DOCUMENTS

| | | | |
|---|---|---|---|
| 4,556,259 | 12/1985 | Feldmann et al. | 303/2 |
| 4,928,724 | 5/1990 | Margerum. | |
| 5,205,315 | 4/1993 | Margerum. | |
| 5,335,978 | 8/1994 | laBastide, Jr.. | |
| 5,393,130 | 2/1995 | Graham | 303/13 |
| 5,435,422 | 7/1995 | Chille. | |
| 5,624,163 | 4/1997 | Kiel et al. | 303/13 |

Primary Examiner—Eric S. McCall
Attorney, Agent, or Firm—Jeffrey P. Calfa; Dennis K. Sullivan

[57] ABSTRACT

An apparatus for operator controlled purging of the tanks of a pressurized air reservoir of a vehicle air system comprises an air actuated normally closed drain valve mounted to an underside of each tank, a source of pressurized air engaged to each drain valve, and a controller for each valve engaged downstream of the source, and within a driver area of the vehicle, the controller when activated, allowing for communication between the source and the drain valve for opening of the valve. The method for using the apparatus in testing air system integrity includes the steps of draining and refilling each tank individually in a pre-defined sequence while monitoring driver area mounted indicators of air pressure levels and testing functionality of an air system operated service brake system of the vehicle by carrying out the pre-defined sequence.

9 Claims, 2 Drawing Sheets

DRIVER CONTROLLED AIR SYSTEM MOISTURE REMOVAL AND PRE-TRIP INSPECTION SYSTEM

BACKGROUND OF THE INVENTION

The present invention relates to a driver-controlled contaminant purging apparatus for use in draining air tanks or compartments of a pressurized pneumatic reservoir of a vehicle such as a truck or a bus and a method of using same in testing the integrity of an air brake system of the vehicle. More specifically, the apparatus allows the vehicle operator to single-handedly test functionality of the air service brake system from within a driver area of the vehicle such test typically being referred to as a pre-trip air system inspection.

THE PRIOR ART

Heretofore, various drain valve apparatus for use in purging contaminants from a pneumatic tank of a vehicle air brake system and methods of use have been proposed.

Most recently, a drain valve and method for using same in automatically draining condensation and contaminants from a wet tank in a pneumatic braking system of a vehicle have been proposed in the Chille, Sr. U.S. Pat. No. 5,435,422. Automatic operation of the drain valve is controlled by vehicle ignition, with engine ignition acting to close the drain valve and engine shut off acting to open the drain valve. To date, however, a contaminant purging apparatus for use in a vehicle air system by means of which a pre-trip inspection of the vehicle air and service brake system may be performed by an operator while in a driver area of the vehicle has not been proposed.

SUMMARY OF THE INVENTION

Accordingly, a primary object of the apparatus and method of the present invention is not only to purge contaminants from all compartments of an air reservoir of a vehicle air system but also to provide an operator with an apparatus by means of which a method for single-handedly performing a mandatory pretrip air and service brake system inspection from a driver area of the vehicle may be carried out.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
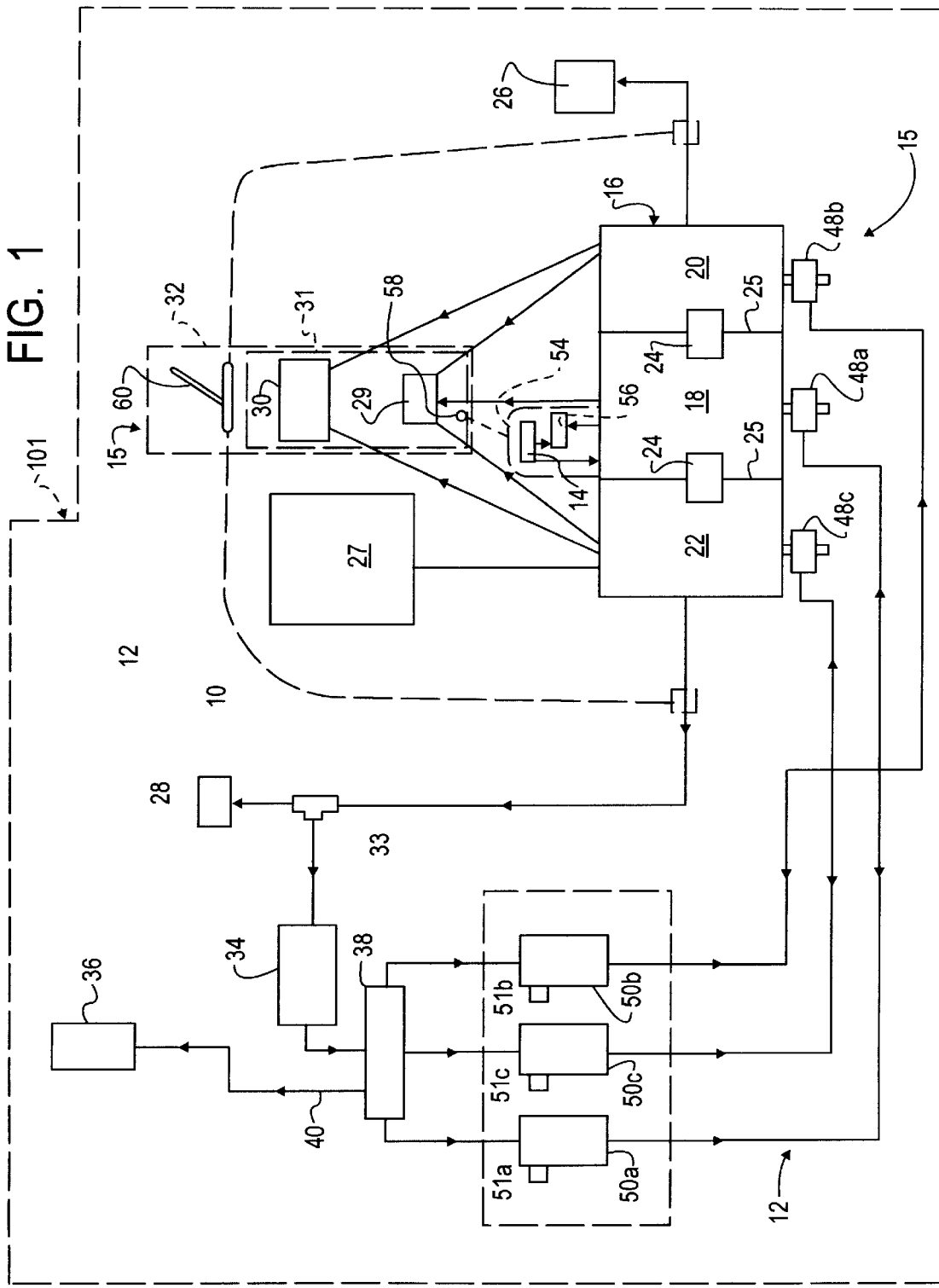
FIG. 1 is a schematic block diagram illustrating the contaminant purging apparatus of the present invention incorporated into a pneumatic or air system of a vehicle which primarily functions in vehicle service brake operation.

Referring now to the drawings in greater detail there is illustrated schematically in FIG. 1 an air system 10 of a vehicle 101 which incorporates a contaminant purging apparatus 12 made in accordance with the teachings of the present invention. The air system 10 obtains its required supply of air from a compressor 14 and uses the air primarily for operation of a vehicle service brake system 15. The compressor 14 feeds air into a compartmentalized multi-tank air reservoir 16 engaging a first compartment or tank of reservoir 16 which is typically referred to as the wet tank 18. Air from the wet tank 18 then flows to each of two further compartments or tanks of the reservoir 16, a first such compartment being considered a primary rear end tank 20 and the second compartment being identified as the secondary front end tank 22.

Air is supplied to the primary rear end tank 20 and the secondary front end tank 22 from the wet tank 18 through a one way check valve 24 interposed in each of two dividing walls 25 separating the wet tank 18 from the secondary front end tank 22 and the primary rear end tank 20. Each one way check valve 24 assures that air entering the primary rear end tank 20 and the secondary front end tank 22 cannot return to the wet tank 18.

In a typical installation, the primary rear end tank 20 supplies air to at least a rear brake portion 26 of the service brake system 15 of the vehicle 101 while the secondary front end tank 22 supplies air to at least a front brake portion 28 of the service brake system 15 of the vehicle 101.

The air system 10 is also capable of accommodating an secondary ancillary tank 27, engaged functionally to the secondary front end tank 22 of the reservoir 16. Such an ancillary tank 27 may at times be desirable for providing a substantially increased supply of pressurized air for use in braking of a vehicle, such as on a school bus.

Figure 2:
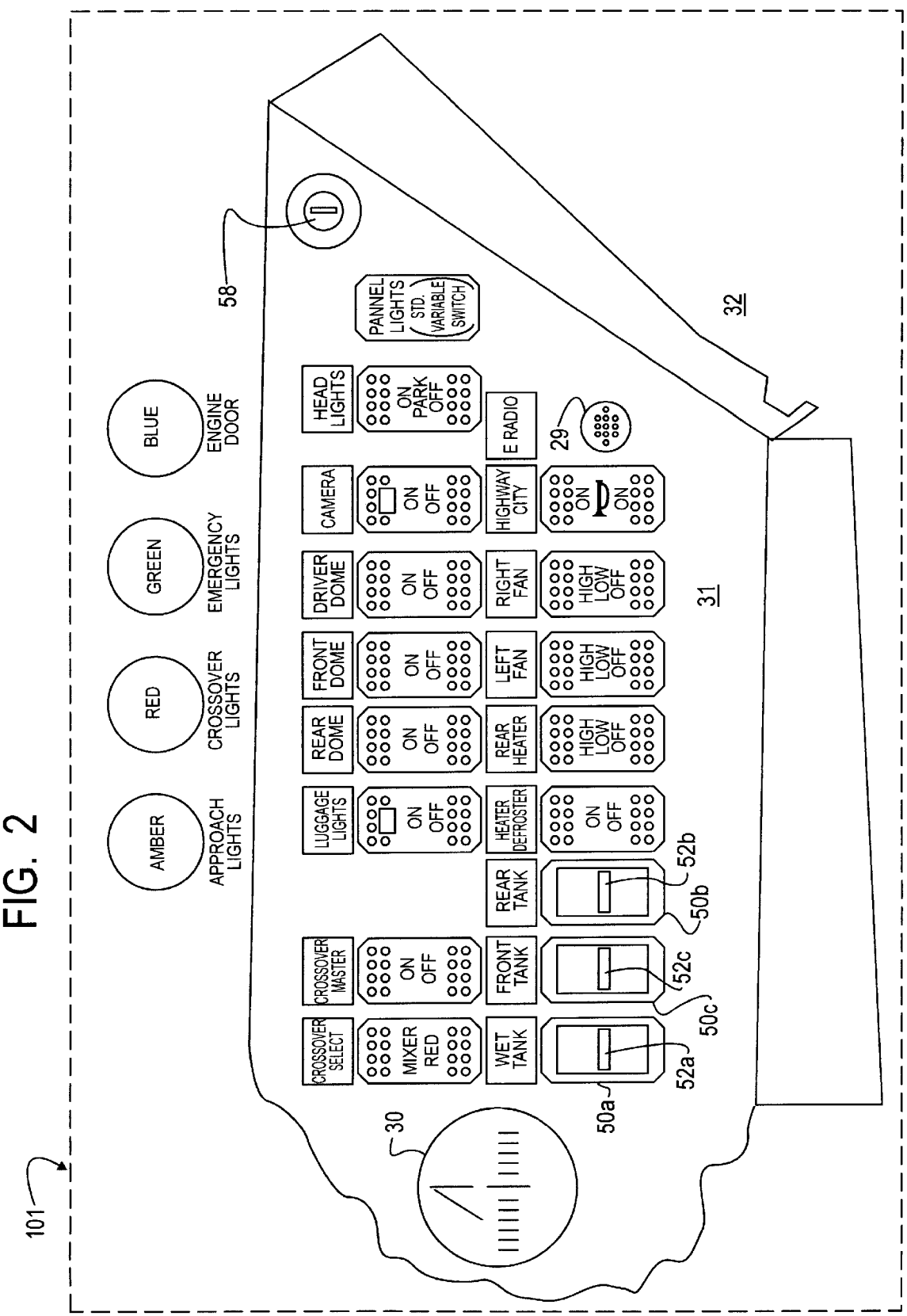
FIG. 2 is a perspective view of a portion of a vehicle dashboard showing placement of actuation switches and a dual air pressure gauge of the apparatus thereon.

The wet tank 18, the primary rear end tank 20, and the secondary front end tank 22 are each operatively engaged to a low pressure warning device 29 which functions to advise an operator of a low pressure condition within the air system 10 which would seriously affect full braking capability. The primary rear end tank 20 and the secondary front end tank 22 are each also functionally engaged to a pressure gauge 30 mounted on a dashboard 31 within a driver area 32 of the vehicle 101, with pressure in each of the primary rear end tank 20 and the secondary front end tank 22 being separately indicated on the pressure gauge 30. See FIGS. 1 and 2.

The secondary front end tank 22, by means of a suitable coupling 33, not only engages the front brake portion 28 of the vehicle 101 but also typically supplies air, via a protection valve 34 to ancillary air operated devices 36 of the vehicle 101, such as, for example, an air horn, a door actuating cylinder of a bus, etc. The protection valve 34 is a normally open valve. Should air pressure drop in the secondary front end tank 22, the protection valve 34 will automatically close, in response to the decreased pressure, blocking any further draw of air there through to any downstream devices. The automatic closure of the protection valve 34 is an attempt by the air system 10 to maintain sufficient air pressure there within for operability of the front brake portion 28 of the vehicle 101.

For accommodation of the contaminant purging apparatus 12 of the present invention, the typical direct supply to the ancillary air operated devices 36 from the protection valve 34 has been eliminated. Rather, a manifold or a splitter 38 is instead engaged downstream of the protection valve 34. The splitter 38 includes a plurality (four shown in FIG. 1) of outlets: first outlet 42, second outlet 44, third outlet 46, and fourth outlet 40.

The fourth outlet 40 is provided for supplying air to the ancillary air operated devices 36. Each of the three further outlets 42, 44, 46 ultimately engage one of a plurality of three normally closed air-operated drain valves 48a, 48b, and 48c respectively, each of which in turn engages and serves one of the tanks of reservoir 16. First outlet 42 engages first drain valve 48a of wet tank 18, Second outlet 44 engages second drain valve 48b of primary rear end tank 20, and third outlet 46 engages third drain valve 46c of secondary front end tank 22, in the embodiment illustrated in FIG. 1.

Interposed between each of the first outlet 42, the second outlet 44, and the third outlet 46 and their respective drain valves 48a, 48b, 48c, are controller 50a, controller 50b, and controller 50c, respectively, which may be defined as the first, second, and third vented momentary control valves 50a, 50b, and 50c. The first momentary control valve 50a is a normally closed valve and incorporates a spring biased toggle switch 52a which must be manually activated and held activated by an operator to cause the first momentary control valve 50a to open and be maintained in an open condition. Toggle switch 52a is located within a driver area 32 of vehicle 101. See FIG. 2. Once toggle switch 52a is released, the first momentary control valve 50a closes under action of a spring 53a (not shown) and air downstream of the first momentary control valve 50a is vented therethrough via a vent port 51a thereof. The second and the third momentary control valves 50b and 50c operate similarly as the first momentary control valve 50a with toggle switches 52b and 52c, springs, and vent ports 51b and 51c, respectively. Additionally, toggle switches 52b and 52c are also located within driver area 32.

Each of the drain valves 48a, 48b, and 48c is positioned to engage a downwardly directed area of the wet tank 18, the primary rear end tank 20, and the secondary front end tank 22, respectively, gravity assisting in draining sludge containing contaminants and moisture as well as air from each of the wet tank 18, the primary rear end tank 20 and the secondary front 10 end tank 22.

In use, when the toggle switch 52a of first momentary control valve 50a, for example, is held in an activated position, air from the first outlet 42 is supplied therethrough to the first drain valve 48a, opening the first drain valve 48a so that the contents of the wet tank 18 passes therethrough, into the ambient environment, effectively purging the wet tank 18.

It has been stated above that the contaminant purging apparatus 12 not only provides for the purging of moisture and contaminants from the air system 10 with such purging being accomplished from the driver area 32 of the vehicle 101 single-handedly by the operator, but also provides a workable method for testing of the service brake system 15 of the vehicle 101 by the operator.

In this respect, it has been found that a specific sequence of steps taken during draining of the wet tank 18, the primary rear end tank 20, and the secondary front end tank 22 will not only purge the wet tank 18, the primary rear end tank 20, and the secondary front end tank 22 but will also test the integrity of the air system 10 of the vehicle 101.

The steps to be followed in undertaking the method begin with starting the vehicle engine 54 (shown in phantom) of the vehicle 101. The reservoir 16, as well as any ancillary tank(s) 27 engaged to and including the wet tank 18, the primary rear end tank 20, and the secondary front end tank 22 thereof, are fully charged by pressurized air pumped thereinto by the compressor 14 which is engine activated by the starting of the vehicle engine 54. The compressor 14 is controlled by a governor 56 (not shown) which deactivates the compressor 14 upon sensed full air charging of the wet tank 18, the primary rear end tank 20, and the secondary front end tank 22. The vehicle engine 54 is then stopped and an ignition switch 58 thereof is then turned to the 'accessory' position. See FIGS. 1 and 2.

The driver engages the first momentary control valve 50a by repositioning and holding the toggle switch 52a in such position which opens the first drain valve 48a for draining the wet tank 18, purging air, moisture and contaminants from the wet tank 18.

During purging of the wet tank 18, the operator observes the pressure gauge 30 which provides readings of pressure within the primary rear end tank 20, and the secondary front end tank 22, respectively. If the pressure readings for the primary rear end tank 20, and the secondary front end tank 22 remain constant during purging, such constancy indicates that the check valves 24 between the wet tank 18 and the primary rear end tank 20, and between the wet tank 18 and the secondary front end tank 22, respectively are functioning in the closed position. If a drop in air pressure in either the primary rear end tank 20, and the secondary front end tank 22 is noticed, the pressure drop indicates a malfunction of the corresponding check valve 24. As the depletion of air within the wet tank 18 continues, the pressure within the wet tank 18 drops to a preset bottom limit which should actuate the low pressure indicator 29. See FIG. 2. If the low pressure indicator 29 does not activate and there is an audible indication of air bleeding from the wet tank 18, a malfunction of the low pressure indicator 29 is indicated.

Once testing of the low pressure indicator 29 is completed, the toggle switch 52a for the first momentary control valve 50a is released, closing the first drain valve 48a on the wet tank 18 and allowing air used to open the first drain valve 48a to exit to the outside environment via vent port 51a.

The vehicle engine 54 is then restarted and the wet tank 18 is fully recharged by the compressor 14, with the operator having an indication of such recharging taking place when the low pressure indicator 29 ceases activity. Further, the operator will also be apprised of full repressurization within the wet tank 18 when the audible sound of the governor 56 of the compressor 14 ceases. The process of fully recharging the wet tank 18 within an acceptable period of time provides an indication that the compressor 14, the governor 56 thereof, any supply lines between the compressor 14 and the wet tank 18, as well as any check valves engaged in such lines, are functioning. If recharging takes too long, intervening component integrity must be checked.

Once full pressure is restored in the wet tank 18, the operator again turns the vehicle engine off and sets the vehicle ignition 58 to "accessory", negating the compressor 14 capability.

The operator then repositions and holds the toggle switch 52c in this position for the third momentary control valve 50c to open, activating the third drain valve 48c of the secondary front end tank 22, to purge the secondary front end tank 22. As purging of the secondary front end tank 22 continues, the pressure gauge 30 should indicate that pressure in the secondary front end tank 22 is dropping. When pressure within the secondary front end tank 22 reaches the low air pressure limit, the low pressure indicator 29 should again activate, indicating functionality. Closure of protection valve 34 on a low pressure condition will not disrupt the test as the third drain valve 48c will remain open due to air locked in between the third momentary control valve 50c and the third drain valve 48c; the third momentary control valve 50c acting as a check valve in this respect.

Once the air pressure drops to this level, the front brake portion 28 of the service brake system 15 is disabled. The operator then restarts vehicle engine 54, immediately engages the vehicle transmission (not shown) and rolls the vehicle 101 forwardly. A vehicle brake pedal 60 is then engaged to test integrity of the rear brake portion 26 of the service brake system 15, in the absence of a functional front brake portion 28. Immediate engagement of the vehicle transmission and the brake pedal 60 is required to test the rear brake portion 26 prior to the compressor 14 recharging the secondary front end tank 22; the compressor 14 having started with the vehicle engine 54.

The third momentary control valve 50c toggle switch 52c is released closing the drain valve 48c, and the secondary front end tank 22 is fully recharged, the indication of which is acquired by viewing the pressure gauge 30, as well as being indicated by the compressor 14 stoppage, and the time period for full recharge is again monitored.

The operator again turns the vehicle engine 54 off and sets vehicle ignition 58 to 'accessory', negating the compressor 14 capability.

The above described steps for draining the secondary front end tank 22 and checking integrity of the portion of the air system 10 not operatively engaged thereto are repeated for the primary rear end tank 20. Here, integrity of the portion of the air system 10 not operatively engaged to the secondary front end tank 20 includes the front brake portion 28 of the vehicle 101 which is then tested in the absence of a functional rear brake portion 26 of the service brake system 15.

The method steps of the procedure set forth above, when carried out in the manner described, provide a full inspection of the air system 10 of the vehicle 101, comfortably and conveniently by an individual operator seated within the driver area 32 of the vehicle 101, such positioning within the driver area 32 allowing for observational access to audible and visible observations of the low pressure indicator 29 and the pressure gauge 30 respectively, during a full cycle of testing operation of the air system 10.

Such full cycle operational testing cannot be accomplished presently without the operator necessarily being outside of the vehicle to manually operate drain petcocks on the tanks, nor can such testing be accomplished with any automatic system presently available for purging.

As described above the contaminant purging apparatus 12 and method of using same of the present invention provide a number of advantages, some of which have been described above, and others of which are inherent in the invention. Also, modifications may be proposed to the contaminant purging apparatus 12 and method without departing from the teachings herein. Accordingly, the scope of the invention is only to be limited as necessitated by the accompanying claims.

What is claimed is:

1. In combination with a mobile vehicle an apparatus for use in testing integrity of an air system, comprising:
   (a) a vehicle with an air system, a driver area, an engine, a transmission, and a pneumatic service brake system;
   (b) said air system, comprising:
      (i) an air reservoir comprised of three internal tanks: a wet tank, a primary rear end tank, and a secondary front end tank;
      (ii) a normally closed air-operated first drain valve engaged to said wet tank;
      (iii) a normally closed air-operated second drain valve engaged to said primary rear end tank;
      (iv) a normally closed air-operated third drain valve engaged to said secondary front end tank;
      (v) two one-way check valves, a first check valve separating said wet tank and said primary rear end tank and allowing for one-way passage from said wet tank to said primary rear end tank, and a second check valve separating said wet tank and said secondary front end tank and allowing for one-way passage from said wet tank to said secondary front end tank;
      (vi) a source of pressurized air functionally engaged to said first drain valve, said second drain valve and said third drain valve;
      (vii) a control means manually operated from within said driver area of said vehicle and interposed between said source of pressurized air and said first drain valve, said second drain valve and said third drain valve, respectively, said control means for allowing and maintaining passage of pressurized air there through for individual opening of said first drain valve, said second drain valve and said third drain valve, respectively;
      (viii) a compressor engaged to said wet tank;
      (ix) a pressure gauge mounted in said driver area and indicating pressure of said primary rear end tank and said secondary front end tank; and
      (x) a low pressure indicator mounted in said driver area and functionally engaged to said wet tank, said primary rear end tank, and said secondary front end tank; and
   (c) said service brake system comprising:
      (i) a front brake portion operatively engaged to said secondary front end tank;
      (ii) a rear brake portion operatively engaged to said primary rear end tank; and
      (iii) a foot pedal operatively engaged to both said front bake portion and said rear brake portion.

2. The apparatus of claim 1 wherein said source of pressurized air is at least one tank of said air reservoir.

3. The apparatus of claim 2 wherein a splitter is engaged downstream of said source of pressurized air and upstream of said control means to provide a plurality of separate outlets.

4. The apparatus of claim 3, wherein:
   (a) a first outlet of said separate outlets of said splitter is engaged to provide an operational air pathway to a first drain valve for said wet tank with said controls means interposed between said splitter and said first drain valve;
   (b) a second outlet of said separate outlets of said splitter is engaged to provide an operational air pathway to a second drain valve for said primary tank with said controls means interposed between said splitter and said second drain valve; and
   (c) a third outlet of said separate outlets of said splitter is engaged to provide an operational air pathway to a third drain valve for said secondary tank with said controls means interposed between said splitter and said third drain valve.

5. The apparatus of claim 4 wherein said splitter includes at least a fourth outlet engaged to a set of auxiliary air devices of said vehicle.

6. The apparatus of claim 5 wherein a pressure activated normally open shutoff valve is engaged between said source of pressurized air and said splitter with a drop in upstream air pressure closing said shut off valve.

7. The apparatus of claim 4 wherein said control means is comprised of
   (a) a first momentary control valve interposed between said first outlet of said splitter and said first drain valve;

(b) a second momentary control valve interposed between said second outlet of said splitter and said second drain valve; and (d) a third momentary control valve interposed between said third outlet of said splitter and said third drain valve.

8. The apparatus of claim 7, wherein:

(a) said first momentary control valve, said second momentary control valve and said third momentary control valve each has an individual toggle switch located within said driver area;

(b) each said toggle switch having two positions:

(i) an open position for which each said toggle switch must be held into open and maintain a pathway from said splitter to said first drain valve, second drain valve, or said third drain valve, respectively; and (ii) a normal closed position to which each said toggle switch is spring biased to close said pathway from said splitter to said first drain valve, second drain valve, or said third drain valve, respectively.

9. A method for testing integrity of an air system of a vehicle including at least pneumatic service brakes comprising the steps of:

(a) entering a driver area of a vehicle, said vehicle being comprised of: an air system, an engine, a transmission, an ignition, and a pneumatic service brake system;

(i) said air system, comprising:

(1) an air reservoir comprised of three internal tanks: a wet tank, a primary rear end tank, and a secondary front end tank;

(2) a normally closed air-operated first drain valve engaged to said wet tank;

(3) a normally closed air-operated second drain valve engaged to said primary rear end tank;

(4) a normally closed air-operated third drain valve engaged to said secondary front end tank;

(5) two one-way check valves, a first check valve separating said wet tank and said primary rear end tank and allowing for one-way passage from said wet tank to said primary rear end tank, and a second check valve separating said wet tank and said secondary front end tank and allowing for one-way passage from said wet tank to said secondary front end tank;

(6) a source of pressurized air functionally engaged to said first drain valve, said second drain valve and said third drain valve;

(7) a control means manually operated from within said driver area of said vehicle and interposed between said source of pressurized air and said first drain valve, said second drain valve and said third drain valve, respectively, said control means for allowing and maintaining passage of pressurized air there through for individual opening of said first drain valve, said second drain valve and said third drain valve, respectively;

(8) a splitter is engaged downstream of said source of pressurized air and upstream of said control means to provide a plurality of separate outlets;

(9) a first outlet of said separate outlets of said splitter is engaged to provide an operational air pathway to said first drain valve with said controls means interposed between said splitter and said first drain valve;

(10) a second outlet of said separate outlets of said splitter is engaged to provide an operational air pathway to said second drain valve with said controls means interposed between said splitter and said second drain valve;

(11) a third outlet of said separate outlets of said splitter is engaged to provide an operational air pathway to said third drain valve with said control means interposed between said splitter and said third drain valve;

(12) said control means is comprised of:

(aa) a first momentary control valve interposed between said first outlet of said splitter and said first drain valve;

(bb) a second momentary control valve interposed between said second outlet of said splitter and said second drain valve; and (cc) a third momentary control valve interposed between said third outlet of said splitter and said third drain valve;

(13) said first momentary control valve, said second momentary control valve and said third momentary control valve each has an individual toggle switch located within said driver area;

(14) each said toggle switch having two positions:

(aa) an open position for which each said toggle switch must be held into open and maintain a pathway from said splitter to said first drain valve, second drain valve, or said third drain valve, respectively; and (bb) a normal closed position to which each said toggle switch is spring biased to close said pathway from said splitter to said first drain valve, second drain valve, or said third drain valve, respectively

(15) a compressor engaged to said wet tank, said compressor operation starting directly tied to said engine starting;

(16) a pressure gauge mounted in said driver area and indicating pressure of said primary rear end tank and said secondary front end tank; and

(17) a low pressure indicator mounted in said driver area and functionally engaged to said wet tank, said primary rear end tank, and said secondary front end tank; and (ii) said service brake system comprising:

(1) a front brake portion operatively engaged to said secondary front end tank;

(2) a rear brake portion operatively engaged to said primary rear end tank; and (3) a foot pedal operatively engaged to both said front bake portion and said rear brake portion;

(b) starting and running said engine of said vehicle and as a result running said compressor until said air reservoir is at least fully charged as indicated on said pressure gauge;

(c) deactivating said compressor by stopping said engine;

(d) turning said ignition to an accessory position;

(e) moving and holding said first momentary control valve toggle switch to open said first drain valve for said wet tank;

(f) observing said pressure gauge for pressure within said secondary front end tank and said primary rear end tank while purging of said wet tank takes place;

(g) observing for actuation of said low pressure indicator when a preset bottom pressure limit is reached;

(h) releasing said first momentary control valve toggle switch to close said first drain valve on said wet tank;

(i) restarting said engine, thereby recharging said wet tank;

(j) observing that said low pressure indicator ceases to be active;
(k) observing for deactivation of said compressor;
(l) observing the period of time taken to recharge said wet tank;
(m) turning said engine off;
(n) setting said ignition to said accessory position to negate compressor capability;
(o) engaging said third momentary control valve toggle switch to open said third drain valve to purge said secondary front end tank;
(p) observing said pressure gauge for pressure readings in said secondary front end tank for an expected pressure drop;
(q) observing for activation of said low pressure indicator when said preset bottom pressure limit is reached;
(r) starting said engine;
(s) immediately engaging said transmission;
(t) immediately rolling said vehicle forwardly;
(u) engaging said foot peal to test integrity of said rear brake portion;
(v) releasing said third momentary control valve toggle switch to close said third drain valve to fully recharge said secondary front end tank;
(w) observing deactivation of said low pressure indicator;
(x) observing said pressure gauge for an indication of recharging of said secondary front end tank;
(y) observing the period of time required to reach full recharge; (z) turning said engine off;
(aa) setting said ignition to said accessory position to negate compressor capability;
(bb) engaging said second momentary control valve toggle switch to open said second drain valve to purge said primary rear end tank;
(cc) observing said pressure gauge for pressure readings in said primary rear end tank for an expected pressure drop;
(dd) observing for activation of said low pressure indicator when said preset bottom pressure limit is reached;
(ee) starting said engine;
(ff) immediately engaging said transmission;
(gg) immediately rolling said vehicle forwardly;
(hh) engaging said foot pedal to test integrity of said front brake portion;
(ii) releasing said second momentary control valve toggle switch to close said second drain valve to fully recharge said primary rear end tank;
(jj) observing deactivation of said low pressure indicator;
(kk) observing said pressure gauge for an indication of recharging of said primary rear end tank; and
(ll) observing the period of time required to reach full recharge.

* * * * *